(12) United States Patent
Arnerup et al.

(10) Patent No.: US 7,481,181 B2
(45) Date of Patent: Jan. 27, 2009

(54) DEVICE FOR FEEDING A LIQUID TO AN ANIMAL

(75) Inventors: Lars Arnerup, Tullinge (SE); Even Jahren, Rakkestad (NO)

(73) Assignee: DeLaval Holding AB, Tumba (SE)

( * ) Notice: Subject to any disclaimer, the term of this patent is extended or adjusted under 35 U.S.C. 154(b) by 396 days.

(21) Appl. No.: 10/555,253

(22) PCT Filed: Apr. 28, 2004

(86) PCT No.: PCT/SE2004/000652

§ 371 (c)(1), (2), (4) Date: Mar. 20, 2006

(87) PCT Pub. No.: WO2004/095916

PCT Pub. Date: Nov. 11, 2004

(65) Prior Publication Data

US 2006/0201435 A1    Sep. 14, 2006

(30) Foreign Application Priority Data

May 2, 2003    (SE)    .................................... 0301279

(51) Int. Cl.
*A01K 7/06*    (2006.01)
*A01K 9/00*    (2006.01)

(52) U.S. Cl. .......................................... 119/71; 119/72

(58) Field of Classification Search .................... 119/72, 119/51.01, 51.5, 71, 72.5, 73–81, 53.5, 54
See application file for complete search history.

(56) References Cited

U.S. PATENT DOCUMENTS

| | | | | | |
|---|---|---|---|---|---|
| 4,149,491 | A | * | 4/1979 | Martin | 119/75 |
| 4,653,432 | A | * | 3/1987 | Smeds | 119/71 |
| 5,315,958 | A | * | 5/1994 | Forster | 119/54 |
| 6,205,952 | B1 | * | 3/2001 | Forster | 119/71 |
| 6,443,093 | B1 | * | 9/2002 | van der Lely et al. | 119/14.01 |

FOREIGN PATENT DOCUMENTS

| | | |
|---|---|---|
| CA | 000002209467 A1 | 7/1997 |
| DE | 29805682 U1 | 9/1998 |
| EP | 1234497 | 8/2002 |
| WO | WO 85/02323 | 6/1985 |

* cited by examiner

*Primary Examiner*—Michael R Mansen
*Assistant Examiner*—Stephen Brookman
(74) *Attorney, Agent, or Firm*—Hovey Williams LLP

(57) ABSTRACT

A device for feeding a liquid to an animal includes a nipple member (6), a reservoir (14) for the liquid (13), a passage (15) having an extension between the reservoir (14) and the nipple member (6), a feeding member (16, 19) arranged to allow a supply of liquid through the passage (15) to the nipple member (6), and a control member (7, 11, 18) arranged to control the activation of the feeding member (16, 19). The control member is arranged to detect the presence of a part of the animal in a predetermined position and to initiate activation of the feeding member (16, 19) when the part of the animal is detected in the predetermined position.

15 Claims, 2 Drawing Sheets

DEVICE FOR FEEDING A LIQUID TO AN ANIMAL

Applicant hereby incorporates by reference International Application PCT/SE2004/000652, filed 28 Apr. 2004, claiming priority from Swedish Application No. 0301279-6 filed 2 May 2003 (also incorporated by reference herein).

BACKGROUND OF THE INVENTION AND PRIOR ART

The present invention relates to a device for feeding a liquid to an animal, wherein the device comprises a nipple member, a reservoir for the liquid, a passage having an extension between the reservoir and the nipple member, feeding means arranged to allow a supply of liquid through the passage to the nipple member, and control means arranged to control the activation of the feeding means.

Such devices are used for feeding a liquid such as, for example, milk or a liquid foodstuff made up from a powdered milk concentrate mixed with water to young animals. The young animals may be calves, lambs, young pigs etc. However, it could be difficult for a very young animal to suck liquid from the reservoir to the nipple member. Therefore, a pump has been arranged in the passage in order to contribute to the transport of the liquid from the reservoir to the nipple member when an animal sucks the nipple member.

DE 298 05 682 U1 shows a device for providing animals with a liquid foodstuff. A pump is here arranged in a conduit between a reservoir containing the liquid foodstuff and a nipple. In one embodiment described in this document, a pressure sensor is arranged in the conduit. The pressure sensor is arranged to sense the pressure in the conduit when a calf sucks the nipple. As soon as a lowered pressure arises in the conduit, the pressure sensor is arranged to initiate activation of the pump. Since the calf only needs to produce a small negative pressure in the conduit for starting the pump, it is not certain that the nipple is in a correct position in the mouth when the pump starts. If the nipple is not in a correct position in the mouth, the risk is obvious that the liquid foodstuff, which is supplied to the nipple, wholly or partially flows out from the mouth. In a second embodiment described in this document, the activation of the pump is manually accomplished by a switch. An operator has here to be very observant in order to initiate a start and a stop of the pump when the animal has the nipple in a correct position. Furthermore, such a manual control of the pump requires great staff resources.

SUMMARY OF THE INVENTION

The object of the present invention is to provide a device, which feeds a liquid from a reservoir to a nipple member only on occasions when an animal has the nipple member in a correct position in the mouth such that unnecessary spill of the liquid is avoided.

This object is obtained according to the invention by the feature that said control means is arranged to detect the presence of a part of the animal in a predetermined position and to initiate activation of the feeding means when said part of the animal is detected in said predetermined position. Consequently, the liquid is only supplied to the nipple member when the animal is in a predetermined position in relation to the nipple member. In such a predetermined position, the liquid is supplied to a certain area in the mouth from which it is easy for the animal to swallow the liquid. In this case, the risk that the supplied liquid flows out from the mouth is considerably reduced. Consequently, the area around the device may be kept clean from spilled liquid and a good hygiene is obtained. Furthermore, the risk that an animal obtains a too small quantity of the liquid is substantially eliminated.

According to a preferred embodiment of the invention, the control means comprises a surface, which is arranged to get into contact with said part of the animal when said part of the animal is in said predetermined position. The control means may comprise a suitable sensor, which senses when said part of the animal is in contact with the surface. Such a sensor may be arranged to initiate activation of the feeding means by generating a signal when said part of the animal gets into contact with said surface. Preferably, said surface is arranged to get into contact with said part of the animal when the nipple member has been introduced a certain distance into the mouth of the animal. Thereby, the feeding of the liquid is only initiated when the free end of the nipple member has been introduced to an area at the back of the mouth of the animal. Such a supply of liquid to an area at the back of the mouth guarantees that unnecessary spill of the liquid is prevented.

Advantageously, said surface is arranged in the vicinity of an inner end portion of the nipple member. In this case, the muzzle or any other part adjacent to the mouth of the animal gets into contact with said surface when substantially the whole nipple member is introduced into the mouth of the animal. Thereby, it is certain that the free end of the nipple member has been introduced to an area at the back of the mouth before the liquid is supplied. Preferably, said surface has an extension around the nipple member. Thereby, the feeding of the liquid may start as soon as any part adjacent to the mouth of the animal gets into contact with said surface.

According to a further embodiment of the invention, said surface is a part of a movable element, which is arranged to be displaced by said part of the animal from an inactive position to an active position. The moveable element may comprise restoring means arranged to restore the moveable element in the inactive position when the contact with said part of the animal interrupts. By such restoring means, the element is automatically displaced back to the non-active position as soon as the contact between the part of the animal and the element is interrupted. At the same time, the feeding of the liquid to the nipple member ends. The restoring means may comprise a suspension of the element such the element automatically is restored to the inactive position by means of the gravity. Alternatively, the restoring means may comprise a suitably arranged spring, which restores the element to the inactive position. The moveable element may be pivotally arranged between the inactive position and the active position. Alternatively, the element may be arranged in other manners, which allow a straight-line motion or another kind of motion between said positions.

According to a further embodiment of the invention, said control means comprises a position sensor arranged to detect when said movable element is in the active position. The position sensor may be a conductive sensor. In this case, the movable element has to comprise a conductive material such as a metal material. In the active position, a part of the movable element is arranged to get in contact with the conductive sensor. The conductive sensor senses the presence of said part of the element and transmits a signal, which initiates feeding of the liquid to the animal. A conductive sensor comprises no moveable parts and the electric components are completely enclosed. Since a cowshed constitutes a very corrosive environment, a conductive sensor is suitable to use. Alternatively, other types of position sensor may be used, which have the ability to sense when the moveable element is in an active position.

According to a further embodiment of the invention, the feeding means comprises a pump. Such a pump may have a suitable location in the passage between the reservoir and the nipple member. If the reservoir is located at a higher level than the nipple member, a feeding of liquid by the gravity to the nipple member is possible. In this case, feeding means may comprise a valve member, which allows a flow of liquid to the nipple member in an open position and prevents such a flow in a closed position.

According to a further embodiment of the invention, the nipple member is mounted in a position such that it inclines downwardly from an inner end portion to an outer free end portion. Preferably, the nipple member inclines downwardly with an angle in a range of 30° to 60° to a vertical plane. Thereby, the animal has to turn its head in a position, in which the throat is open. Advantageously, the device comprises drainage means arranged below the nipple member. When an animal sucks the nipple member, saliva and liquid inevitably will trickle down from the mouth of the animal. It may be collected and drawn off by such a drainage member.

According to a further embodiment of the invention, the device comprises an outer housing enclosing at least some components of the device. Such a housing forms the outer surfaces of the device and provides a good protection of the enclosed parts of the device from outer influences and dirt. The nipple member may be arranged in a recess of the housing. In such a recess, the nipple member has a protected position. Furthermore, it is simple to arrange a drainage member at the bottom surface of such a recess. The device may comprise wall members, which form a stall for the animal using the device. Such walls provide a shut off from the surroundings such that the animal can consume the liquid without being disturbed.

BRIEF DESCRIPTION OF THE DRAWINGS

In the following, preferred embodiments of the invention are described by examples and with references to the attached drawings, in which.

DETAILED DESCRIPTION OF THE INVENTION

Figure 1:
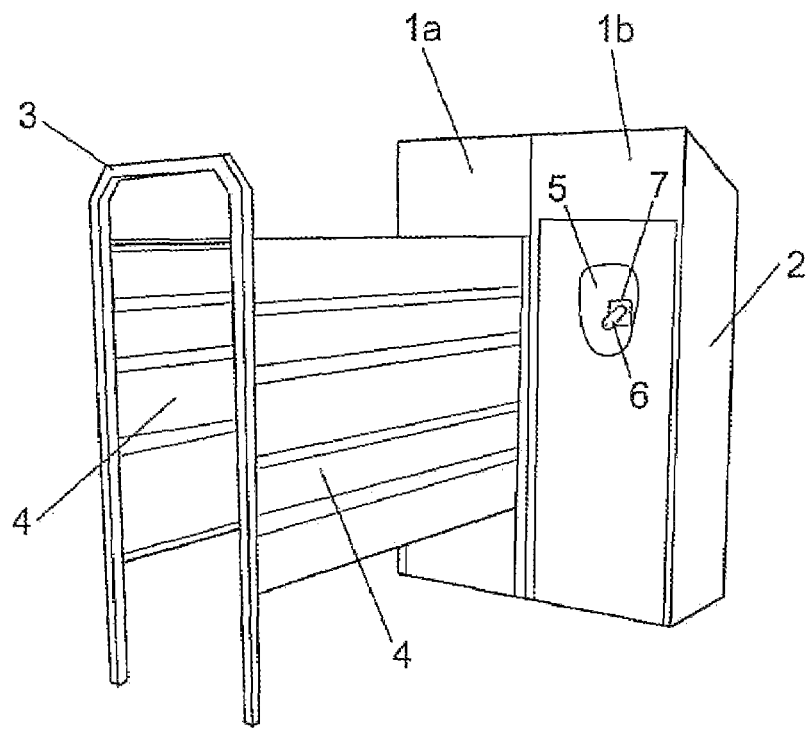
FIG. 1 shows two devices for feeding liquid to animals.

FIG. 1 shows two devices 1a, b, which are arranged to allow the feeding of a liquid to young animals, such as, calves, lambs, young pigs etc. The liquid may be milk or a liquid foodstuff made up from a powdered milk concentrate mixed with water. Each of the devices 1a, b comprises an outer box-like housing 2. The housings 2 enclose a number of components of the devices 1a, b. The housings 2 protect said components from outer influences and dirt. The device 1a is provided with a stall for the animals using the device. The stall is constructed by a frame member 3, forming an entrance to the stall, and two parallel walls 4. The walls 4 extend between between the frame member 3 and a front of the device 1a. The housing 2 of the device 1b has a visible front surface. At a substantially central part of the front surface, a recess 5 is located. In the recess 5, a nipple member 6 and an outer part of a movable element are visible.

The animals are provided with a transponder or a similar device such as an ear tag. The devices 1a, b comprises a reader for identifying the animals. A control unit, such as a computer provided with suitable software, is arranged to control the quantity of milk fed to the respective animals. Such a control unit may be arranged inside the respective devices 1a, b. Alternatively, a superior control system will control the feeding of milk from the devices 1a, b to the animals.

Figure 2:
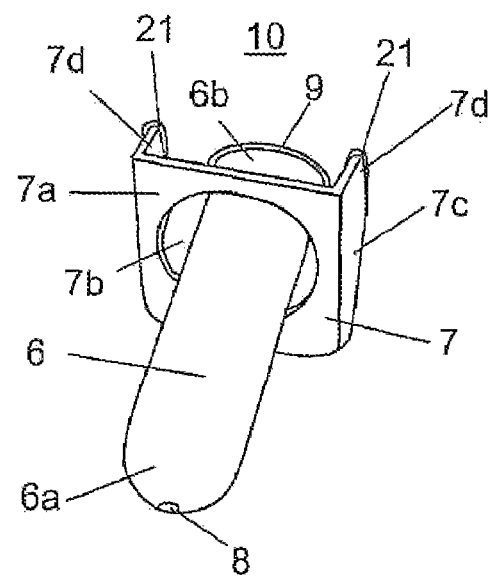
FIG. 2 shows the nipple member in FIG. 1 in more detail and FIG. 3 shows a sectional view from the side of the device 1b in FIG. 1

FIG. 2 shows the nipple member 6 and the outer part of the movable element 7 in FIG. 1 more in detail. The nipple member 6 is conventional and is made of a resilient hollow body having an elongated shape. An outer free end portion 6a of the nipple member comprises an opening, 8, through which the milk is supplied to, for example, a calf. An inner end portion 6b of the nipple member is fixedly attached in an opening 9 of a wall 10, which defines the concave surface of the recess 5. The nipple member 6 is mounted in a position such that it inclines downwardly from the inner end portion 6b to the outer free end portion 6a. The movable element 7 has a front surface 7a, which is substantially located in a vertical plane. The front surface 7a extends around the nipple member 6 at the vicinity of its inner end portion 6b. The movable element 7 comprises a circular opening 7b through which the nipple member extends. The movable element 7 comprises side portions 7c at opposite sides. The side portions 7c extend substantially perpendicular to the front surface 7a. The movable element 7 comprises a transverse portion 7d at each of the upper ends of the side portions 7c. Each of the transverse portions 7d extend through a slit-shaped opening 21 in the wall 10.

Figure 3:
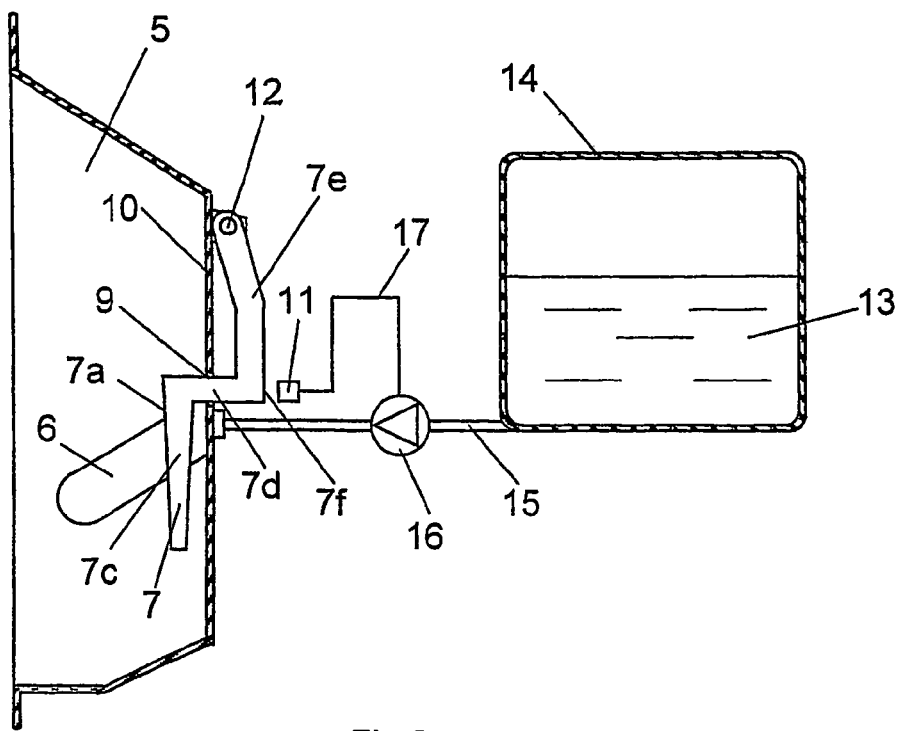

FIG. 3 shows a sectional view of the device 1b seen from the side. The movable element 7 comprises, at each side, vertical arms 7e. One of the arms 7e is visible in FIG. 3. The arms 7e have a substantially vertical extension from the transverse portion 7d to an articulated connection 12 at an upper end to the inner surface of the wall 10. Consequently, the movable element 7 is pivotally arranged at the articulated connections 10. The movable element 7 hangs down in an inactive position by the gravity. A conductive sensor 11 is arranged at a small distance from a stop surface 7f of the movable element 7. Inside the housing 2, the device 1b comprises a reservoir 14 filled with milk 13. Furthermore, the device 1b comprises a pipe 15 having an extension from a bottom portion of the reservoir 14 to the nipple member 6 and a pump 16, which is located in the pipe 15. In this case, the nipple member 6 inclines downwardly with an angle of about 45° to a vertical plane. Preferably, the nipple member 6 has an angle of 30° to 60° to the vertical plane.

A small calf, which is going to use the device, enters the stall and begins to suck the nipple member 6. Preferably, the nipple member 6 is arranged on a level such that the calf has to bend the knees in order to introduce the nipple member 6 in the mouth. Thereby, the calf has to turn the head in a position such that the throat is open. The walls 4 of the stall provide a shut off from the surroundings such that the calf can suck the nipple member 6 without being disturbed. For small calves, it is difficult to produce a required lowered pressure in the pipe 15 for transporting milk from the reservoir 14 to the nipple member 6. For that reason, the pump 16 is arranged to feed milk through the pipe 15 to the nipple member 6 when a calf sucks the nipple member 6. The reservoir 14 will receive fresh milk from an automatic milking system. Alternatively, the reservoir 14 will receive stored milk from a cooling tank. In this case, the receiver 14 has to be provided with a suitable heater.

When the calf has introduced the nipple member 6, a certain distance into the mouth, the muzzle or another part of the calf located around the mouth gets into contact with the front surface 7a of the movable element. Thereby, said part of the calf displaces the element 7 such that the element 7 gets a pendulous motion from the inactive position to an active position. In the active position, a stop surface 7e of the element engages a surface of the conductive sensor 11. The conductive sensor 11 senses the presence of the stop surface 7e and transmits an activation signal through the wire 17 to the pump 16. The pump 16 starts and milk is fed in the pipe 15 to the nipple member 6. When the contact between the calf and the front surface 7a ends, the element 7 is automatically pivoted back to the inactive balance position by the gravity. Thereby, the contact between the stop surface 7f and the conductive sensor 13 is interrupted and the activation signal to the pump 16 is discontinued. The pump 15 stops the feeding of milk to the nipple member 6.

Consequently, milk is fed to the nipple member 6 only when a part located around the mouth of the calf is in contact with the front surface 7a of the element. Since the front surface 7a is located in the vicinity of the inner end portion 6b of the nipple member, milk is only fed to the nipple member 6 when substantially the whole nipple member 6 has been introduced into the mouth. Thereby, it is guaranteed that milk is supplied to an area at the back of the mouth. By feeding the milk to an area at the back of the mouth, the spill of milk will be considerably reduced. Therefore, the area around the device may be kept substantially clean from spilled milk and a good hygiene is easily maintained.

Figure 4:
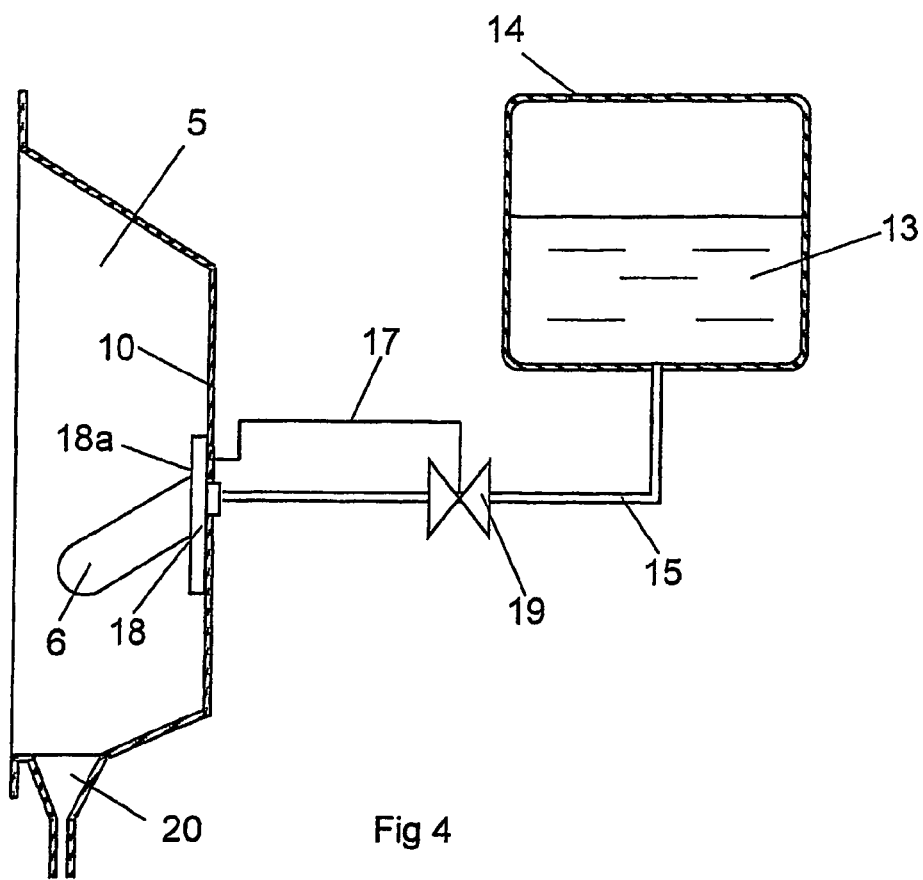
FIG. 4 shows an alternative embodiment of a device for feeding a liquid to an animal.

FIG. 4 shows an alternative embodiment of the invention. In this embodiment, the control means comprises a contact sensor 18. The contact sensor 18 has a front surface 18a in the vicinity of the inner end portion 6b of the nipple member. The contact sensor 18 may be a conventional pressure sensor, which senses when a pressure acts on the front surface 18a. The contact sensor 18 is in a suitable way attached to the wall 10 forming the recess 5. When a calf has introduced substantially the whole nipple member 6 into the mouth, the muzzle or another part of the calf located around the mouth gets into contact with the front surface 18a. The contact sensor 18 senses the pressure of said part of the calf and initiates an activation signal in the wire 17 to a valve 19. The valve 19 is located in a pipe 15, which extends between a reservoir 14 and the nipple member 6. In this case, the reservoir 14 is located at a considerably higher level than the nipple member 6. The activation signal is arranged to set the valve 19 in an open position. Thereby, a flow of milk 13 from the reservoir 14 is obtained by the gravity, via the pipe. 15, to the nipple member 6. When the contact sensor 18 does not any longer sense a pressure at the front surface 18a, the activation signal is interrupted and the valve 19 is set in a closed position. Thereby, the feeding of milk to the nipple member 6 ends.

Consequently, milk is fed to the nipple member 6 only when a part of the calf is in contact with the front surface 18a of the sensor 18. The front surface 18a is located in the vicinity of the inner end portion 6b of the nipple member. Therefore, the muzzle of the calf is only in contact with the nipple member 6 when substantially the whole nipple member 6 is introduced into the mouth. Thereby, it is guaranteed that milk is supplied to an area at the back of the mouth. Milk located at an area at the back of the mouth is easy to swallow for a calf and the spill of milk will be considerably reduced. In this case, a drainage 20 is arranged at a bottom part of the recess 5. With such a drainage 20, possible dregs from the mouth when the calf sucks the nipple member 6 is collected. Thereby, drops of saliva and milk will be prevented from falling to the floor. Therefore, a further increased hygiene is obtained.

The invention is not limited to the described embodiment but may be varied and modified freely within the scope of the claims. The control means may comprise a substantially arbitrary sensor for detecting when a part of the animal is in a predetermined position. The feeding means may comprise arbitrary components, which allows a controlled flow of liquid to the animal. Certainly, arbitrary combinations of different kinds of control means and feeding means are possible.

The invention claimed is:

1. A device for feeding a liquid to an animal having a mouth, wherein the device comprises a nipple member, a reservoir for the liquid, a passage having an extension between the reservoir and the nipple member, feeding means arranged to allow a supply of liquid through the passage to the nipple member, and control means arranged to control the activation of the feeding means wherein said control means is arranged to detect the presence of a part of the animal in a predetermined position and to initiate activation of the feeding means when said part of the animal is detected in said predetermined position, wherein said control means comprises an element having a surface which is arranged to get in contact with said part of the animal when said part is in said predetermined position and when the nipple member has been introduced a predetermined distance into the mouth of the animal and wherein said surface is arranged in the vicinity of an inner end portion of the nipple member and said surface in a substantially circumferentially surrounding relationship around said inner end portion, and wherein said element is a movable element which is pivotally arranged to be displaced by said part of the animal from an inactive position to an active position.

2. A device according to claim 1, wherein said surface is arranged in radially spaced relationship to the inner end portion of the nipple member.

3. A device according to claim 1, wherein the moveable element comprises restoring means arranged to restore the moveable element in the inactive position when the contact with said part of the animal is interrupted.

4. A device according to claim 1, wherein said control means comprises a position sensor arranged to detect when said movable element is in an active position.

5. A device according to claim 4, wherein said position sensor is a conductive sensor.

6. A device according to claim 1, wherein the feeding means comprises a pump.

7. A device according to claim 1, wherein the feeding means comprises a valve member which in an open position allows a supply of liquid to the nipple member by gravity.

8. A device according to claim 1, wherein the nipple member is mounted in a position such that it inclines downwardly from an inner end portion to an outer free end portion.

9. A device according to claim 1, wherein the device comprises a drain which is located substantially below the nipple member.

10. A device according to claim 1, wherein the device comprises an outer housing which encloses at least some of the components of the device.

11. A device according to claim 10, wherein the nipple member is arranged in a recess of the housing.

12. A device according to claim 1, wherein the device comprises wall members which form a stall for the animal using the device.

13. A device according to claim 4, wherein the feeding means comprises a pump.

14. A device according to claim 4, wherein the feeding means comprises a valve member which in an open position allows a supply of liquid to the nipple member by gravity.

15. A device according to claim 4, wherein the device comprises wall members which form a stall for the animal using the device.

* * * * *